United States Patent [19]

Bonne et al.

[11] Patent Number: 5,459,962
[45] Date of Patent: Oct. 24, 1995

[54] TRAPPING PROTECTOR FOR POWER-OPERATED CLOSING DEVICES

[75] Inventors: Andreas Bonne, Neukirch; Klaus Glagow, Wasserburg; Sebastian Jäger, Kressbronn; Bernhard Weiss, Lindau/Bodensee; Gyala Haber, Wangen; Jürgen Schaberick, Lindau/Bodensee, all of Germany

[73] Assignee: Metzeler Automotive Profiles GmbH, Lindau/Bodensee, Germany

[21] Appl. No.: 427,161

[22] Filed: Apr. 26, 1995

Related U.S. Application Data

[63] Continuation of Ser. No. 149,058, Nov. 8, 1993, abandoned.

[30] Foreign Application Priority Data

Aug. 9, 1993 [DE] Germany .............. 43 26 738.6
Sep. 2, 1993 [DE] Germany .............. 43 29 535.5

[51] Int. Cl.⁶ .................................................. E05F 15/08
[52] U.S. Cl. ................................ 49/28; 200/61.43
[58] Field of Search ..................... 49/28, 27, 26; 200/61.43

[56] References Cited

U.S. PATENT DOCUMENTS 3,710,050  1/1973  Richards ............... 49/28 X
3,793,772  2/1974  Kouth .................... 49/28
4,199,637  4/1980  Sado ..................... 428/119
4,621,223  11/1985 Murakami et al. ....... 49/28 X
4,742,196  5/1988  Kelly ..................... 200/86 R
4,773,183  9/1988  Okushima et al. ...... 49/28
4,943,757  7/1990  Richter et al. ......... 49/28 X
5,023,418  6/1991  Beckhausen .
5,072,080  10/1991 Beckhausen .
5,157,230  10/1992 Blubaugh ............... 200/61.43
5,296,658  3/1994  Kramer et al. .

*Primary Examiner*—Philip C. Kannan
*Attorney, Agent, or Firm*—Herbert L. Lerner; Laurence A. Greenberg

[57] ABSTRACT

Power-operated closing devices, particularly electrically operated windows and sunroofs of motor vehicles, have two electrical conductors being spaced apart from each other for disengaging a switching process of a drive unit when brought into contact. For the purposes of simple manufacture and reliable contact-making, a trapping protector is provided, which includes a flexible hollow profile made of an elastomer or plastic material having a flat base area and a mounted arched profile area enclosing a hollow chamber. The base area and a zenith area of the arched profile area include conductive material and are separated from each other by insulating profile areas.

17 Claims, 4 Drawing Sheets

TRAPPING PROTECTOR FOR POWER-OPERATED CLOSING DEVICES

This application is a continuation of application Ser. No. 08/149,058, filed Nov. 8, 1993, now abandoned.

BACKGROUND OF THE INVENTION

FIELD OF THE INVENTION

The invention relates to a trapping protector for power-operated closing devices, particularly for electrically operated windows and sunroofs of motor vehicles, with two electrical conductors being spaced apart from each other for disengaging a switching process of a drive unit when brought into contact.

Such a trapping protector is known, for example, from German Published, Npn-Prosecuted Applications DE 34 24 581 A1 or DE 37 24 085 A1. In those cases, however, predominantly metallic electrical conductors are brought directly into contact with each other, so that on one hand there is a risk of corrosion and on the other hand there is a danger of faulty re-setting of the conductors after a longish period of use, whereby a long-term service life is greatly reduced. Moreover, the profiles are very complicated to manufacture and delicate to fit.

SUMMARY OF THE INVENTION

It is accordingly an object of the invention to provide a trapping protector for power-operated closing devices, which overcomes the hereinafore-mentioned disadvantages of the heretofore-known devices of this general type, which is simply constructed and which is capable of long-term service. Moreover, it should be able to be led round angled corners with ease and have simple connection and coupling components as well as permit simple initial installation without damaging the individual components.

With the foregoing and other objects in view there is provided, in accordance with the invention, in a power-operated closing device, especially for electrically operated windows and sunroofs of motor vehicles, including two mutually spaced apart electrical conductors disengaging or triggering a switching process of a drive unit when being brought into contact, a trapping protector comprising a flexible or elastic hollow profile being formed of an elastomer or plastic material and including a flat base area, an arched profile area, and insulating profile areas mounting the arched profile area on the flat base area and enclosing a hollow chamber, the flat base area and the zenith area including conductive material.

Through the use of a simply constructed hollow profile of this kind, when pressure is exerted on any point along the profile, a switching process for reversing or stopping a drive unit is triggered by the resulting resistance reduction and current increase when the conductive areas touch.

In accordance with another feature of the invention, an approximately semicircular profile area, having profile sections adjoining the base area which include non-conductive material, is mounted on the edges of the flat base area.

In accordance with a further feature of the invention, the conductive areas on the inside of the hollow chamber each have an electrically conductive projection.

In accordance with an added feature of the invention, there is provided a metallic through conductor embedded in each of the conductive profile areas, in order to achieve a lower resistance.

In accordance with an additional feature of the invention, the hollow profile is disposed laterally on the vehicle interior of panes of the vehicle windows and below an upper window guide profile.

In accordance with yet another feature of the invention, the hollow profile is laterally fixed to frame parts of the vehicle windows.

In accordance with yet a further feature of the invention, the hollow profile is disposed along upper edges of the windows of a front door and a rear door of the vehicle.

In accordance with yet an added feature of the invention, the hollow profile is disposed along a front edge and also on side edges and a rear edge of a sunroof and/or an opposing roof opening edge.

In accordance with yet an additional feature of the invention, the hollow profile of the trapping protector is mounted or fitted as a component being separate from other sealing profiles.

In accordance with again another feature of the invention, however, the hollow profile is manufactured integrally in material connection with other profiles.

In accordance with again a further feature of the invention, the hollow profile is connected to the interior leg of the window guide profile on the upper side of the vehicle window with one corner as a single piece and is extruded as a single piece together with the window guide profile.

In accordance with again an added feature of the invention, for connections in bending corner areas, ends of the hollow profile adjoining a corner are pushed onto a correspondingly angled insert contact with the cross-section of the hollow chamber, and the insert contact has conducting layers on the top and underside which are separated by an insulating layer in the center.

In accordance with again an additional feature of the invention, the connection contact for the electrical connection has a cross section corresponding to the hollow chamber of the hollow profile at one end, at the other end it continues into a block-shaped end piece from which two contact pins project, and the connection contact has conducting layers on the top and underside which are separated by an insulating layer in the center.

In accordance with still another feature of the invention, for hollow profiles with inserted conductors, the block-shaped end piece has a rear side on which contact tips in contact with the conductors are disposed.

In accordance with a concomitant feature of the invention, the conductive areas of the hollow profile are manufactured by adding conductive materials to the base material. Carbon blacks or graphite or even a metal powder are particularly suitable as conductive materials.

Other features which are considered as characteristic for the invention are set forth in the appended claims.

Although the invention is illustrated and described herein as embodied in a trapping protector for power-operated closing devices, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

5,459,962

DESCRIPTION OF THE PREFERRED EMBODIMENTS

Figure 1:
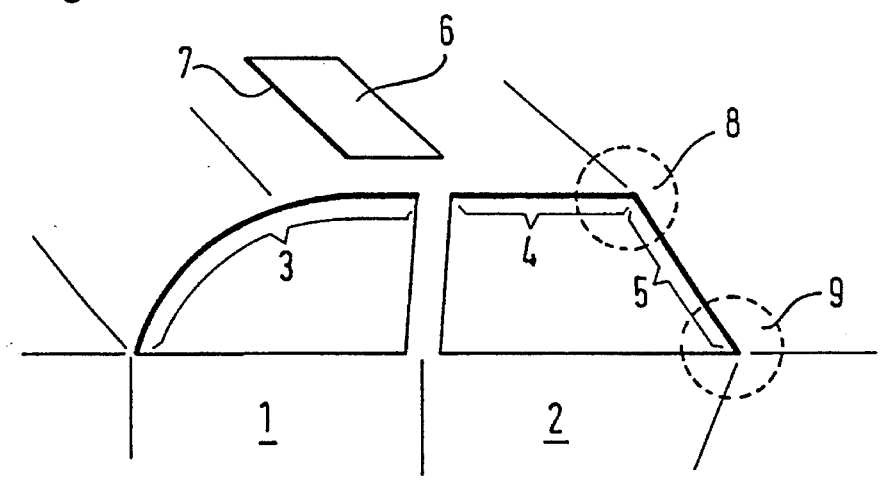
FIG. 1 is a fragmentary, diagrammatic, side perspective view of a vehicle with areas to be protected.

Referring now to the figures of the drawing in detail and first, particularly, to FIG. 1 thereof, there is seen a diagrammatic side perspective view of a vehicle in the area of a front door 1 and a rear door 2. In particular an area 3, namely an A-pillar area of the front door, an area 4, namely on the top of the rear door 2, and an area 5 on a C-pillar of the rear door, are to be equipped with a trapping protector. The vehicle has a profile area with bending corner areas 8 and an area 9. In the case of a sunroof 6 it is also possible to correspondingly protect a front edge 7 and also to include side edges and a rear edge if required, in the protection.

Figure 2:
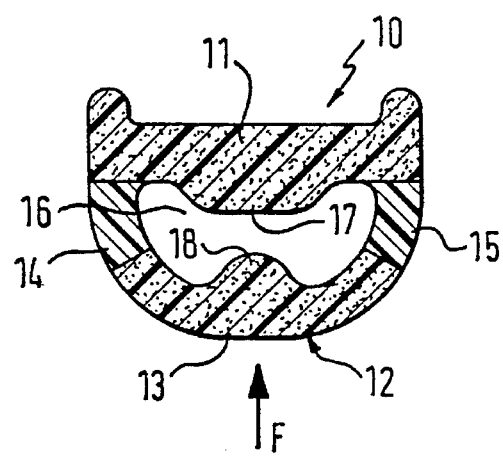
FIG. 2 is a cross-sectional view of a hollow profile with two conductive areas.

FIG. 2 shows a trapping protector of this kind in detail. A corresponding hollow profile 10 has a flat base area 11 of conductive material and an approximately semicircular profile area 12 being mounted on edges of the flat area 11 and having a zenith or vertex area 13 which also includes conductive material. This conductive area 13 is separated from the base area or web 11 by two areas 14 and 15 of non-conducting material.

The profile areas 11 and 12 thus enclose a hollow chamber 16. The conductive areas 11 and 13 each have a respective electrically conducting projection 17 and 18 on the inside of the hollow chamber 16.

Elastomers, thermoplastic elastomers or thermoplastics can be used as the material for this hollow profile 10, with it being possible to create the conductivity of the conducting areas 11 and 13 by adding conductive materials such as carbon blacks, graphite or metal powder to a base material.

Under the effect of a force F and pressure on the arched profile area 12 at any point along the profile and touching of the conductive areas 17 and 18, a resistance reduction and therefore a current increase is produced in the conducting areas 11 and 13 so that a switching process to reverse or stop a drive unit in an electrical or electronic line is triggered.

Figure 3:
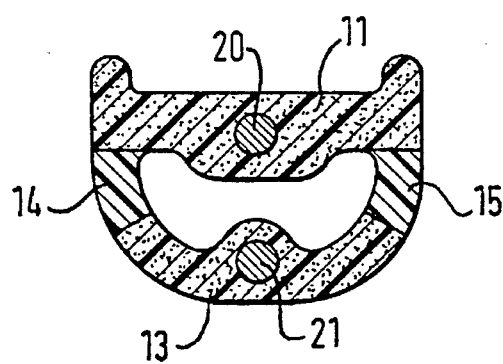
FIG. 3 is a view similar to FIG. 2 of another embodiment of this hollow profile.

FIG. 3 shows a further possible embodiment of a hollow profile of this kind. In this case metallic conductors 20 and 21 are respectively embedded in the conducting profile areas 11 and 13, which can take place by coextrusion. The electrical transition resistance of the entire system can be further reduced by means of these metallic conductors 20 and 21. When the profile is compressed at any point, only the transition resistance between the metallic conductors 20 and 21 and the conducting material 11 and 13 in between has a crucial influence on the overall resistance.

Figure 4:
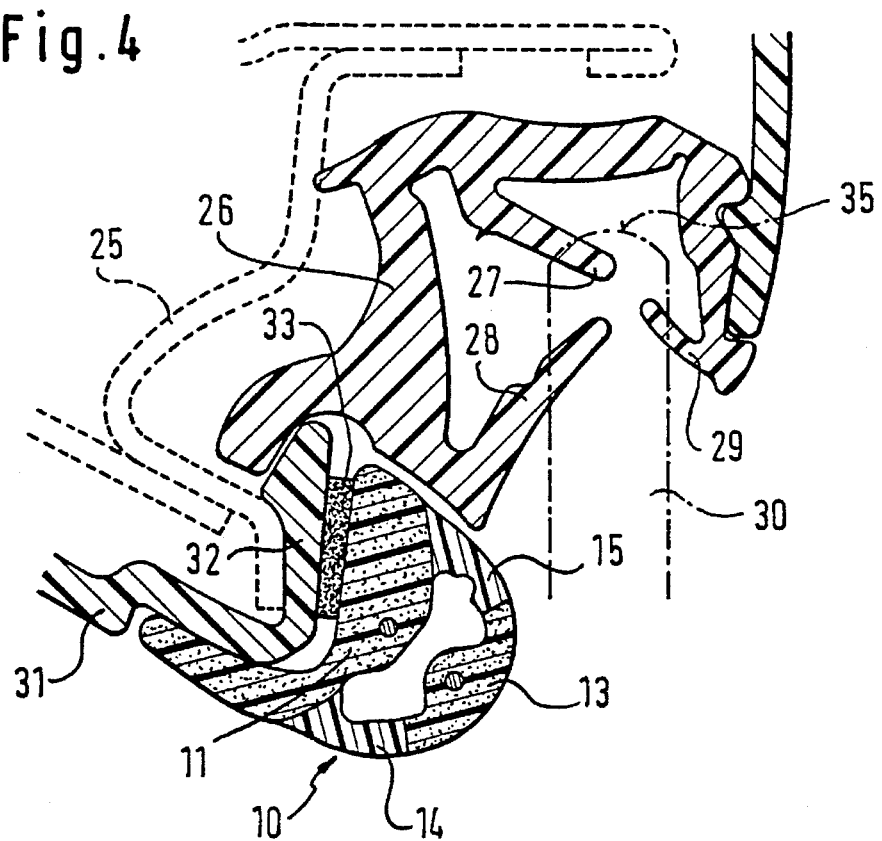
FIG. 4 is a fragmentary, cross-sectional view of a separate configuration of the hollow profile in relation to a window to be protected.

FIG. 4 shows a possible configuration of a hollow profile of this kind in the area of a window pane, as a separate configuration and as being separate from other profiles. As can be seen from the diagrammatic drawing, an upper window guide profile 26, which receives and seals a window pane 30 moving upwards with three sealing lips 27, 28 and 29, for example, is buttoned or engaged inside an upper door frame 25.

The actual hollow profile 10 with its conducting areas 11 and 13 as well as the non-conducting intermediate pieces 14 and 15, is fixed to an upwardly-projecting leg 32 by an adhesive strip 33 on a plastic covering 31 surrounding the lower edge of the frame 25.

A configuration of this kind ensures that, for example, when a hand is on an upper edge 35 of the window pane 30 and the window pane 30 is being raised electrically, the hand initially comes into contact with the profile 10 and thus presses the conducting area 13 onto the conducting base area 11 and causes a corresponding contact to stop the window drive.

Figure 5:
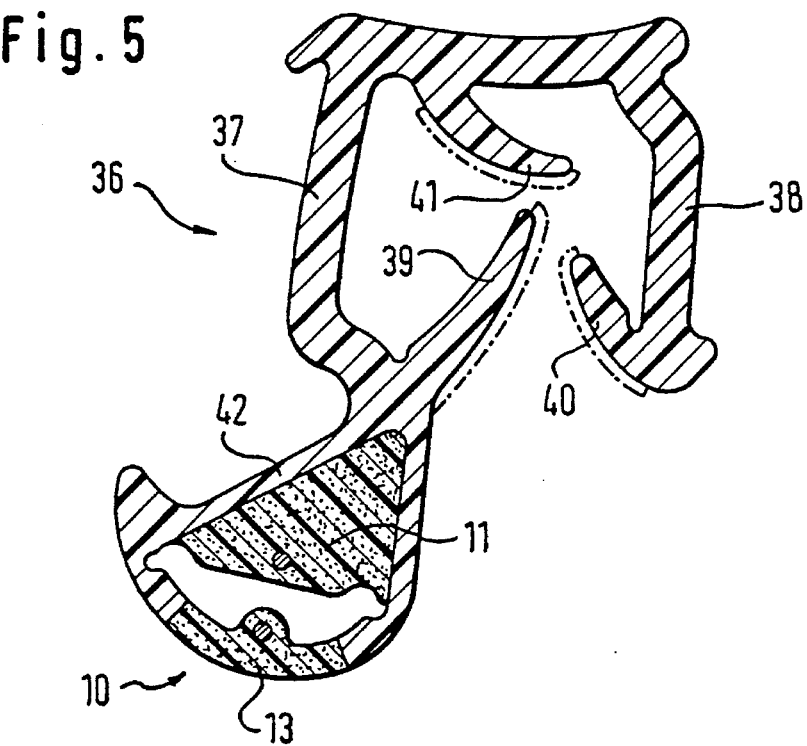
FIG. 5 is a fragmentary, cross-sectional view of a one-piece embodiment of the hollow profile and a window guide profile.

FIG. 5 shows a hollow profile which is constructed as one piece with a profile. An illustrated window guide profile 36 with two lateral legs 37 and 38 and sealing lips 39 and 40 and/or 41 is directly connected to one corner of the hollow profile 10 at a free end of the inner leg 37 and is extruded with it in one piece. A non-conducting rubber of the leg 37 continues directly as a sheath 42 of the conducting area 11 of the hollow profile 10.

By analogy with the embodiment illustrated in FIG. 5, the hollow profile can also be constructed in one piece with any other functional profile on the vehicle.

Figure 6:
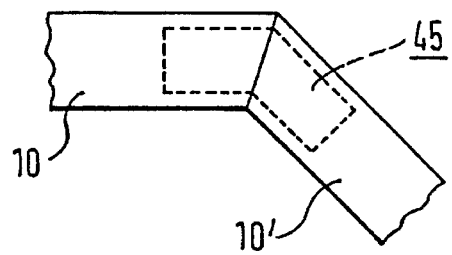
FIG. 6 is a fragmentary, elevational view of a corner connection.

FIG. 6 shows a corner connection of hollow profiles 10 and 10', which meet at an angle An insert contact 45, which is shown in greater detail in FIG. 7 in a perspective view at an angle from below, is pushed into mitered ends of this hollow profile.

This insert contact 45 has a cross-section which corresponds to the hollow chamber 16 of the hollow chamber profile 10 and runs at the same angle as the two meeting hollow profiles 10 and 10'. This insert contact 45 has an upper side or layer 46 and an underside or lower layer 47 of conducting material which are separated from each other by means of an insulation layer 48. A reliable contact connection between two hollow profile sections of this kind is reliably assured because of the outer contour of this insert contact 45 which is matched to the hollow chamber. Generally speaking, the hollow profiles 10 and 10' are placed on the insert contact 45 and sprayed over with an insulating rubber mixture, an insulating thermoplastic elastomer or an insulating thermoplastic. If required it is also sufficient for the profiles to be simply placed or bonded onto the insert contact 45.

Figure 8:
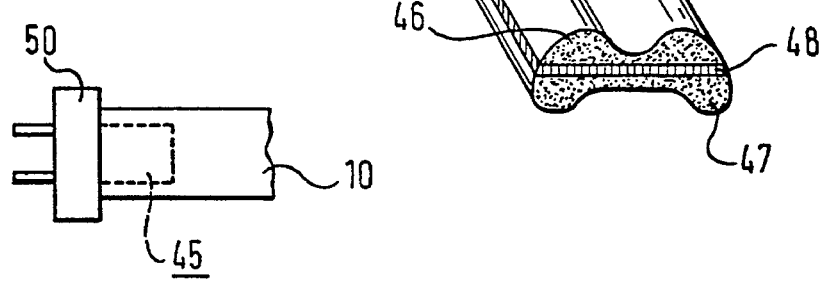
FIG. 8 is a fragmentary, elevational view of a connection contact.

FIG. 8 shows an electrical connection contact 50 for the end of a hollow profile 10, as is used in the area 9 according to FIG. 1.

Figure 7:
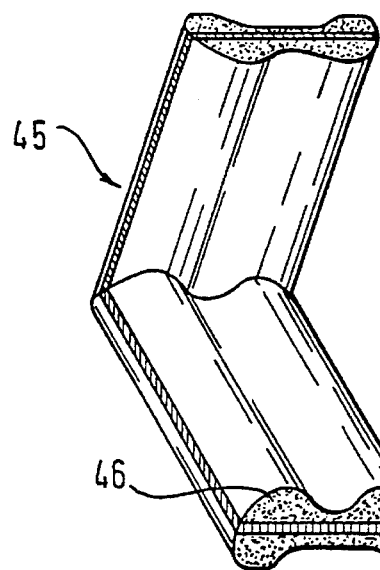
FIG. 7 is a perspective view of an insert contact of this kind for a corner connection.
Figure 9:
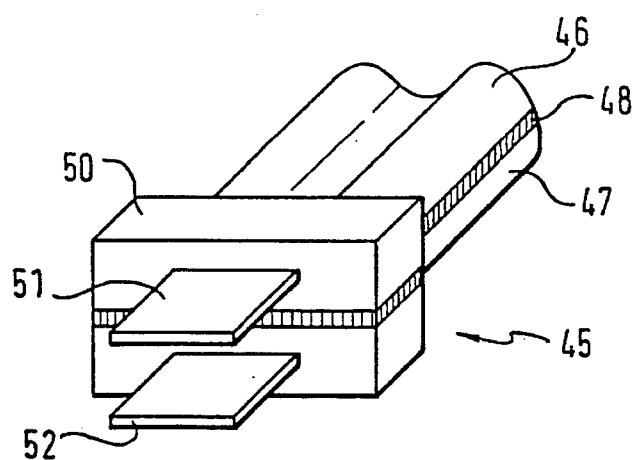
FIG. 9 is a perspective view of a connection contact of this kind.

The construction of a connection contact 50 of this kind according to FIG. 8, as is shown in detail in FIG. 9, essentially corresponds to the insert contact according to FIG. 7 in which an insert contact or area 45 to be pushed into the hollow profile 10 is provided with an outer contour that corresponds to the inner contour of the hollow conduit 16 and includes an upper conducting layer 46, a lower conducting layer 47 and an insulating layer 48 inserted in between. In the area of this connection contact which lies outside of the hollow profile 10, it becomes a block-shaped end piece 50 of the same layered construction as the contact piece 45, from which two contact pins 51 and 52 for connection to drive leads project.

Figure 10:
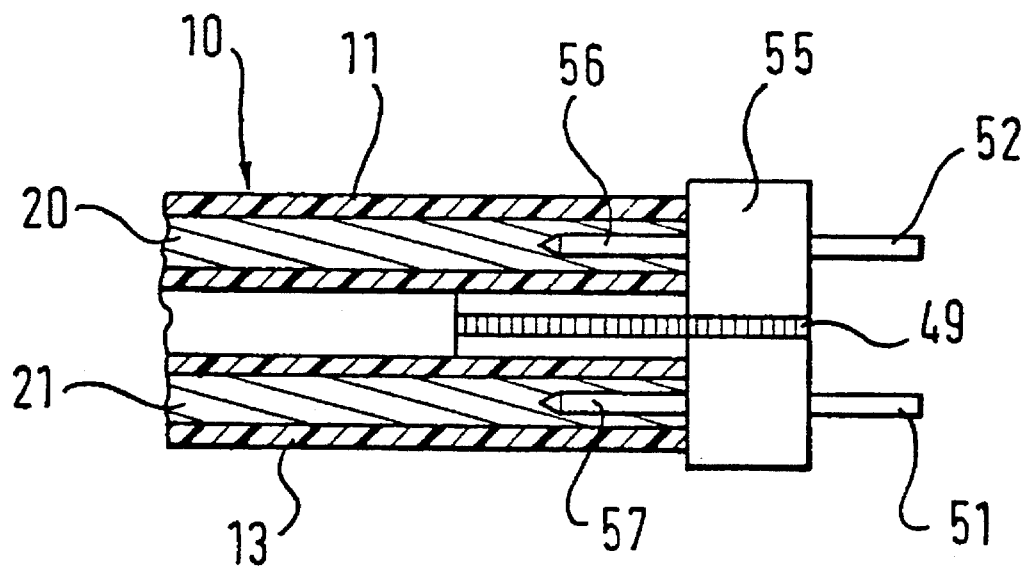
FIG. 10 is a fragmentary, partly sectional, side-elevational view of a connection contact for a hollow profile with electrical conductors.
Figure 11:
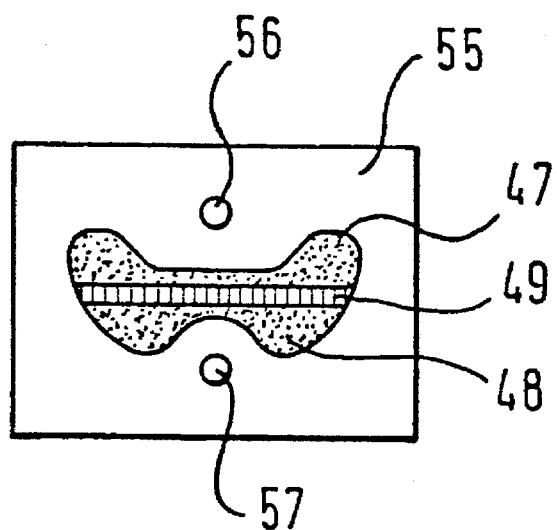
FIG. 11 is a front-elevational view of this connection contact.

In the case of a hollow profile 10 with two inner electrical conductors 20 and 21, according to FIGS. 10 and 11, a connection contact piece 55 is to be provided which has the same construction as the contact piece in FIGS. 8 and 9 in principle, but in which two contact tips 56 and 57, which rest on the conductors 20 and 21 in a satisfactorily conducting manner and thus form a reliable contact, emerge from the block-shaped end of the contact piece 55 on its rear side. Therefore, a trapping protector is created which overall is very simply constructed and permits a wide range of options in terms of construction and installation.

We claim:

1. In a power-operated closing device including two mutually spaced apart electrical conductors initiating a switching process of a drive unit when being brought into contact, a trapping protector assembly comprising: a profile strip of elastomeric material, said profile strip being formed as a one-piece, coextruded member including a sealing profile for sealing the closing device, and a trapping protector in the form of a flexible hollow profile connected with said sealing profile;

said hollow profile having a flat base area, and an arched profile area formed of a zenith area and insulating profile areas mounting said zenith area on said flat base area, said flat base area and said arched profile area enclosing a hollow chamber therebetween, said flat base area and said zenith area being electrically conductive by means of conductive material incorporated in said elastomeric material;

a metallic through conductor coextruded in said flat base area and a metallic through conductor coextruded in said zenith area, said metallic through conductors being means for reducing an electrical resistance of said flat base area and said zenith area; and said flat base area and said zenith area each having a respective projection projecting inside said hollow chamber.

2. The trapping protector according to claim 1, wherein said arched profile area is approximately semicircular, said flat base area has edges, and said insulating profile areas are formed of non-conductive material, adjoin said base area and mount said arched profile area on said edges of said flat base area.

3. The trapping protector according to claim 1, wherein the conductive material are selected from the group consisting of carbon blacks, graphite and metal powder.

4. In a motor vehicle having power-operated closing devices for windows or sunroofs, a drive unit for electrically operating the closing devices, and two mutually spaced apart electrical conductors initiating a switching process of the drive unit when being brought into contact, a trapping protector comprising:

a flexible hollow profile being formed of an elastomer or plastic material and including a flat base area, an arched profile area having a zenith area, and insulating profile areas mounting said arched profile area on said flat base area and enclosing a hollow chamber, said flat base area and said zenith area being at least partly formed of conductive material of the conductors;

wherein the vehicle has a profile area with bending corner areas; and including an insert contact having approximately the same cross section as said hollow chamber, top and bottom conducting layers and a central insulating layer separating said conducting layers; and another identically constructed hollow profile, said hollow profiles having adjoining ends being angled corresponding to and pushed onto said angled insert contact in the bending corner areas.

5. The trapping protector according to claim 4, wherein the windows have window panes with interior surfaces facing into the vehicle, the windows have an upper window guide profile, and said flexible hollow profile is disposed laterally at the interior surfaces of the panes and below the upper window guide profile.

6. The trapping protector according to claim 4, wherein the windows have frame parts, and said hollow profile is laterally fixed to the frame parts.

7. The trapping protector according to claim 4, wherein the vehicle has front and rear doors in which the windows are disposed, and the windows have upper edges along which said hollow profile is disposed.

8. The trapping protector according to claim 4, wherein the sunroof has edges, the vehicle has roof opening edges disposed opposite the edges of the sunroof, and said hollow profile is disposed along at least one of the edges.

9. The trapping protector according to claim 4, wherein said hollow profile is a special component being mounted separate from other sealing profiles.

10. The trapping protector according to claim 4, wherein said hollow profile is integrally manufactured in material connection with other profiles.

11. The trapping protector according to claim 10, wherein the vehicle window has an upper side, the vehicle has a window guide profile with an interior leg, said hollow profile has a corner connected to the interior leg as a single piece on the upper side of the vehicle window, and said hollow profile is extruded as a single piece together with the window guide profile.

12. The trapping protector according to claim 4, wherein the conductivity of said conducting layers is developed by adding conductive materials to a base material.

13. The trapping protector according to claim 12, wherein the conductive materials are selected from the group consisting of carbon blacks, graphite and metal powder.

14. In a power-operated closing device including two mutually spaced apart electrical conductors initiating a switching process of a drive unit when being brought into contact, a trapping protector assembly comprising:

a flexible hollow profile being formed of an elastomer or plastic material and including a flat base area, an arched profile area, and insulating profile areas formed of a zenith area mounting said arched profile area on said flat base area and enclosing a hollow chamber, said flat base area and said zenith area being at least partly formed of conductive material of the conductors; and a connection contact for an electrical connection, said connection contact having one end with a cross-section corresponding to said hollow chamber, another end with a block-shaped end piece from which two contact pins project, upper and lower conducting layers, and a central insulating layer separating said conducting layers.

15. The trapping protector according to claim 14, including a metallic through conductor being embedded in said flat base area and a metallic through conductor being embedded in said zenith area, said block-shaped end piece having a rear side on which two contact tips in contact with said conductors are disposed.

16. The trapping protector according to claim 14, wherein the conductivity of said conducting layers is developed by adding conductive materials to a base material.

17. The trapping protector according to claim 16, wherein the conductive materials are selected from the group consisting of carbon blacks, graphite and metal powder.

* * * * *